(12) United States Patent
Fang et al.

(10) Patent No.: US 8,631,208 B2
(45) Date of Patent: Jan. 14, 2014

(54) PROVIDING ADDRESS RANGE COHERENCY CAPABILITY TO A DEVICE

(75) Inventors: Zhen Fang, Portland, OR (US); David J. Harriman, Portland, OR (US); Michael W. Leddige, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 12/360,533

(22) Filed: Jan. 27, 2009

(65) Prior Publication Data

US 2010/0191920 A1 Jul. 29, 2010

(51) Int. Cl.
*G06F 13/00* (2006.01)

(52) U.S. Cl.
USPC .................................. 711/141; 711/E12.027

(58) Field of Classification Search
USPC ........................ 711/141, 146, 204, 147–152
See application file for complete search history.

(56) References Cited

U.S. PATENT DOCUMENTS

| | | | |
|---|---|---|---|
| 4,598,363 A | | 7/1986 | Clark et al. |
| 5,504,921 A | | 4/1996 | Dev et al. |
| 5,586,297 A | * | 12/1996 | Bryg et al. ..................... 711/143 |
| 5,819,028 A | | 10/1998 | Manghirmalani et al. |
| 5,903,749 A | | 5/1999 | Kenner et al. |
| 6,009,488 A | | 12/1999 | Kavipurapu |
| 6,138,171 A | | 10/2000 | Walker |
| 6,148,337 A | | 11/2000 | Estberg et al. |
| 6,477,667 B1 | | 11/2002 | Levi et al. |
| 6,504,785 B1 | | 1/2003 | Rao |
| 6,704,842 B1 | * | 3/2004 | Janakiraman et al. ........ 711/141 |
| 6,892,312 B1 | | 5/2005 | Johnson |
| 7,069,480 B1 | | 6/2006 | Lovy et al. |
| 7,298,758 B2 | | 11/2007 | Robertson |
| 7,467,277 B2 | * | 12/2008 | Barnum et al. ............... 711/167 |
| 7,509,540 B1 | | 3/2009 | Lovy et al. |
| 7,516,247 B2 | | 4/2009 | Hummel et al. |
| 7,610,569 B2 | | 10/2009 | Park |
| 7,774,522 B2 | | 8/2010 | Bouvier |
| 7,805,550 B2 | | 9/2010 | Kimelman et al. |
| 7,917,729 B2 | | 3/2011 | Georgiou et al. |
| 8,009,584 B1 | | 8/2011 | Viswanath et al. |
| 8,024,499 B1 | | 9/2011 | Aybay et al. |
| 2004/0024871 A1 | | 2/2004 | Kitchin |
| 2004/0078528 A1 | * | 4/2004 | Chauvel et al. ............... 711/141 |
| 2004/0162942 A1 | * | 8/2004 | Lee et al. ...................... 711/117 |
| 2004/0162944 A1 | * | 8/2004 | Kim et al. ..................... 711/120 |
| 2005/0223178 A1 | | 10/2005 | Garcia et al. |

(Continued)

OTHER PUBLICATIONS

U.S. Patent and Trademark Office, Office Action mailed Apr. 1, 2011 with Reply filed Jun. 28, 2011, in U.S. Appl. No. 12/482,614.

*Primary Examiner* — Edward Dudek, Jr.
*Assistant Examiner* — Sean D Rossiter
(74) *Attorney, Agent, or Firm* — Trop, Pruner & Hu, P.C.

(57) ABSTRACT

In one embodiment, the present invention includes a method for receiving a memory request from a device coupled to an input/output (IO) interconnect, accessing a mapping table associated with the IO interconnect to determine if an address range including an address of the memory request is coherent, and if so, sending the memory request and a coherency indicator to indicate the coherent state of data at the address, otherwise sending the memory request and the coherency indicator to indicate a non-coherent state. Other embodiments are described and claimed.

20 Claims, 3 Drawing Sheets

(56) References Cited

U.S. PATENT DOCUMENTS

| | | | |
|---|---|---|---|
| 2006/0101226 A1* | 5/2006 | Benhase et al. ............... 711/203 |
| 2006/0168396 A1 | 7/2006 | LaMothe et al. |
| 2007/0150671 A1 | 6/2007 | Kurland |
| 2007/0186071 A1* | 8/2007 | Bellows et al. ............... 711/167 |
| 2007/0294486 A1* | 12/2007 | Goodman et al. ............ 711/146 |
| 2008/0130543 A1 | 6/2008 | Singh et al. |
| 2008/0209133 A1* | 8/2008 | Ozer et al. .................... 711/146 |
| 2009/0019232 A1* | 1/2009 | Deshpande et al. .......... 711/141 |
| 2010/0191920 A1 | 7/2010 | Fang et al. |
| 2010/0191921 A1* | 7/2010 | Cantin ......................... 711/147 |

\* cited by examiner

PROVIDING ADDRESS RANGE COHERENCY CAPABILITY TO A DEVICE

BACKGROUND

Modern computer systems include various components that are interconnected to communicate and perform tasks. Many system implementations include one or more processors and peripheral devices that may be coupled to the processor by way of one or more interconnect levels.

As these various components may operate on common data, mechanisms to maintain a coherent view of such data may be implemented. In typical x86 computer systems, data is said to be cacheable and coherent when that data may be stored at various storage locations within the system and mechanisms are implemented to maintain a coherent view of such data. Alternately, other data may be indicated to be non-cacheable/non-coherent, meaning that this data is not cacheable and is generally owned by a single entity such that a view of the data may be maintained non-coherently.

In today's computer systems, cacheability and coherence choices are controlled through an address range approach on the processor side. On an input/output (IO) device side, however, the same need is passed to hardware on a per-request basis through a request annotation approach, which uses different semantics from those used by the processor. The inconsistency between processor side and IO side in cacheability and coherence control has undesirable ramifications for application and device driver developers in terms of both system performance and debugging.

For example, when a device issues a request packet to an interconnect, a bit in the request packet contains a hint to indicate whether this request must be maintained coherent. This bit is coded by the device driver programmer. Thus, the device programmer needs to be extremely careful about, and often makes assumptions on, the cacheability and coherence attributes of memory locations, and errors can lead to problems. For example, if a page is tagged cacheable in a processor side mechanism, but a device driver uses non-coherent memory requests, incorrect execution results may occur, unless the processor side software flushes the shared memory regions out of all caches in advance. However, this raises complexity and hinders performance. Another situation is when the IO device annotates a read request as cacheable/coherent but the processor indicates that the memory location is non-cacheable/non-coherent. Since the processor will never load this memory into the caches, snoop requests spawned by IO device-issued memory requests are meaningless. Nevertheless, these snoops consume system resources and impact performance of both processor threads and IO devices. A more serious effect will occur if the system caches coherent IO data. On such a system, the IO data is stored in the cache but will not be snooped by the processor, which can be a source of program errors.

DETAILED DESCRIPTION

Figure 1:
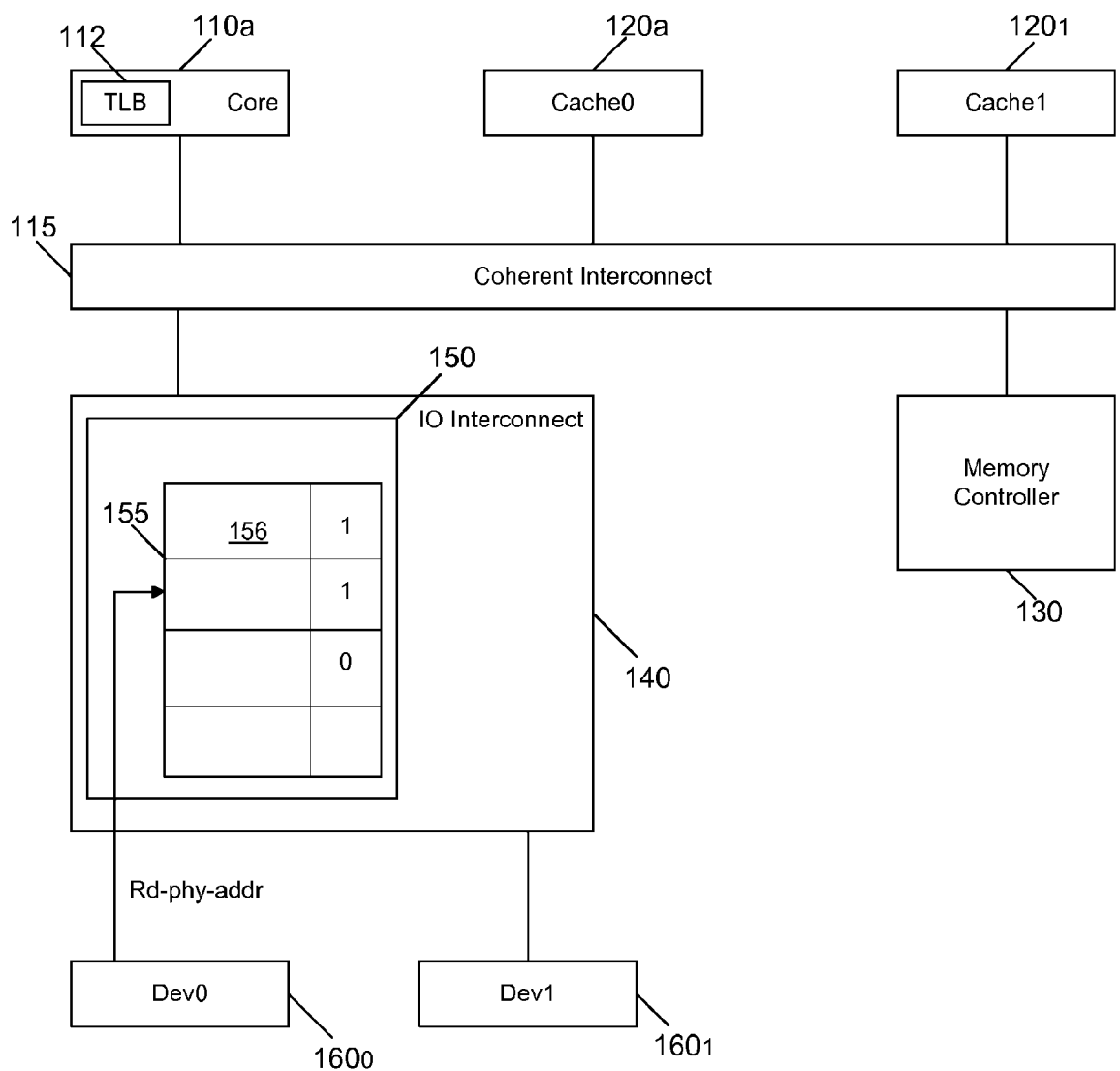
FIG. 1 is a block diagram of a system in accordance with one embodiment of the present invention.

In various embodiments, address range-based coherence control may be provided for an interconnect to which one or more peripheral devices such as intellectual property (IP) blocks are coupled. That is, while the scope of the present invention is not limited in this regard, some implementations may be realized in a so-called system-on-a-chip (SoC) in which various components are configured on a single integrated circuit package, typically on a single semiconductor die. For example, a SoC may include multiple processor cores, cache memories, various interconnect levels, and additional devices such as specialized processing units that may be referred to as IP blocks, all of which may originate with a single vendor. In such implementations, as the same software vendor is typically owner of the code for both processor and IP block, a more consistent coherence control may avoid coding errors that would cost time to market (TTM). However, understand that at least some IP blocks of a first vendor may be integrated in a SoC of another vendor, which aggregates its own IP blocks along with one or more IP blocks of other vendors.

One implementation may use a translation lookaside buffer (TLB)-like structure associated with an interconnect to map each physical address of a device request (e.g., on a per physical page size granularity) to a coherence/non-coherence indicator. For ease of discussion, this structure may be referred to as a coherence TLB (c-TLB) which can be managed by hardware like an x86 processor TLB. Generally, coherency and cacheability may be referred to herein as coherency for ease of discussion. An operating system (OS) page fault handler may be responsible for keeping the c-TLB consistent with page table mechanisms of the processor.

Thus in general, on the processor side, cacheability and coherence choices are achieved using an address range approach. For a x86 architecture, this can be realized using memory type range registers (MTRRs) and page tables (collectively referred to herein as page tables for simplicity). Portions of the page tables stored in main memory may be stored in a processor TLB. Software sets up the cacheability/coherency attributes of each page (e.g., via a coherence field in the page table), and then uses generic load/store (ld/st) instructions to access memory. At execution time, memory management unit (MMU) hardware converts generic read and write instructions into either cached/coherent or non-cached/non-coherent memory transactions.

Thus a mapping table may translate physical page numbers to cache coherency attributes. In one embodiment, the content of the table is a subset of the processor page table, and the table can be organized, managed and accessed like a processor TLB. For example, certain bits of a physical page number can be used to index a high-associativity structure; the rest of the physical page number bits can be used for tag comparison; and a "coherent/non-coherent" indicator is returned upon a hit, or a miss handler is initiated upon a miss. Note however, in some implementations the c-TLB only provides the coherence attribute indicator for a given page number. By using embodiments of the present invention, a device can issue generic memory requests to a memory location without specifying the coherent attribute explicitly in the command. As such, the c-TLB provides translation from a physical page number to a coherence attribute.

Referring now to FIG. 1, shown is a block diagram of a system in accordance with one embodiment of the present invention. As shown in FIG. 1, system 100 may be a system on a chip that includes various components interconnected together and which may include similar mechanisms to handle coherency, both on a processor side and IO side. These mechanisms may be address range-based, in which control of coherency is on a given memory range granularity, e.g., memory page size such as a 4K memory page, although the scope of the present invention is not limited in this regard. Specifically, in the embodiment of FIG. 1, SoC 100 may include a plurality of processor cores only one of which, core $110_a$, is shown for ease of illustration.

The one or more cores may be coupled via a coherent interconnect 115 to one or more cache memories $120_a$ and $120_1$. Coherent interconnect 115 may include various hardware, software and/or firmware to implement a cache coherency protocol, such as a modified exclusive shared invalid (MESI) protocol, to maintain a coherent view of information stored within the system. In some implementations, coherent interconnect 115 may be a layered protocol including various layers such as a protocol layer, a link layer and possibly a physical layer (where the system is not on a single die).

In turn, coherent interconnect 115 may be coupled to a memory controller 130 that in turn may be coupled to a system memory, e.g., dynamic random access memory (DRAM), for example. Note that such memory is not shown in FIG. 1, as the memory may be external to the SoC.

In addition, coherent interconnect 115 may be coupled to an upstream side of an IO interconnect 140 which may be of a given communication protocol such as a Peripheral Component Interconnect Express (PCI Express™ (PCIe™)) protocol in accordance with links based on the PCI Express™ Specification Base Specification version 2.0 (published Jan. 17, 2007) (hereafter the PCIe™ Specification), or another such protocol. IO interconnect 140 may include a c-TLB 150 in accordance with an embodiment of the present invention. While shown as being present in the interconnect, other implementations may locate this buffer elsewhere in close relation to the interconnect. In turn various devices, e.g., devices $160_0$ and $160_1$, may be coupled to a downstream side of IO interconnect 140.

As seen in FIG. 1, c-TLB 150 may include a table 155 that stores a plurality of entries, e.g., entry 156. Each entry may include an address field, which may store at least some bits of an address associated with memory requests, e.g., a portion of a physical address provided with memory requests from one of devices 160. Still further, each entry may include a coherency field that stores a coherency indicator to indicate a coherent status with regard to the corresponding address. In various implementations, the granularity of each entry may correspond to a page in memory, although the scope of the present invention is not limited in this regard. As will be discussed further below, the information stored in the entries of c-TLB 150 may be obtained from one or more mapping mechanisms of a system, such as a TLB present in core 110.

While shown with this particular implementation in the embodiment of FIG. 1, the scope of the present invention is not limited in this regard. For example, in some implementations, in addition to a c-TLB, a more conventional TLB may also be present in the IO interconnect, and which can act as a subset of a processor TLB to store virtual address (VA) to physical address (PA) mappings and related information. Further, while described as a page table implementation, other embodiments may handle coherency according to a control register such as a MTRR. In such an implementation, instead of a c-TLB, a copy of the MTRR or other control register values may be stored in a dedicated storage in the IO interconnect.

Figure 2:
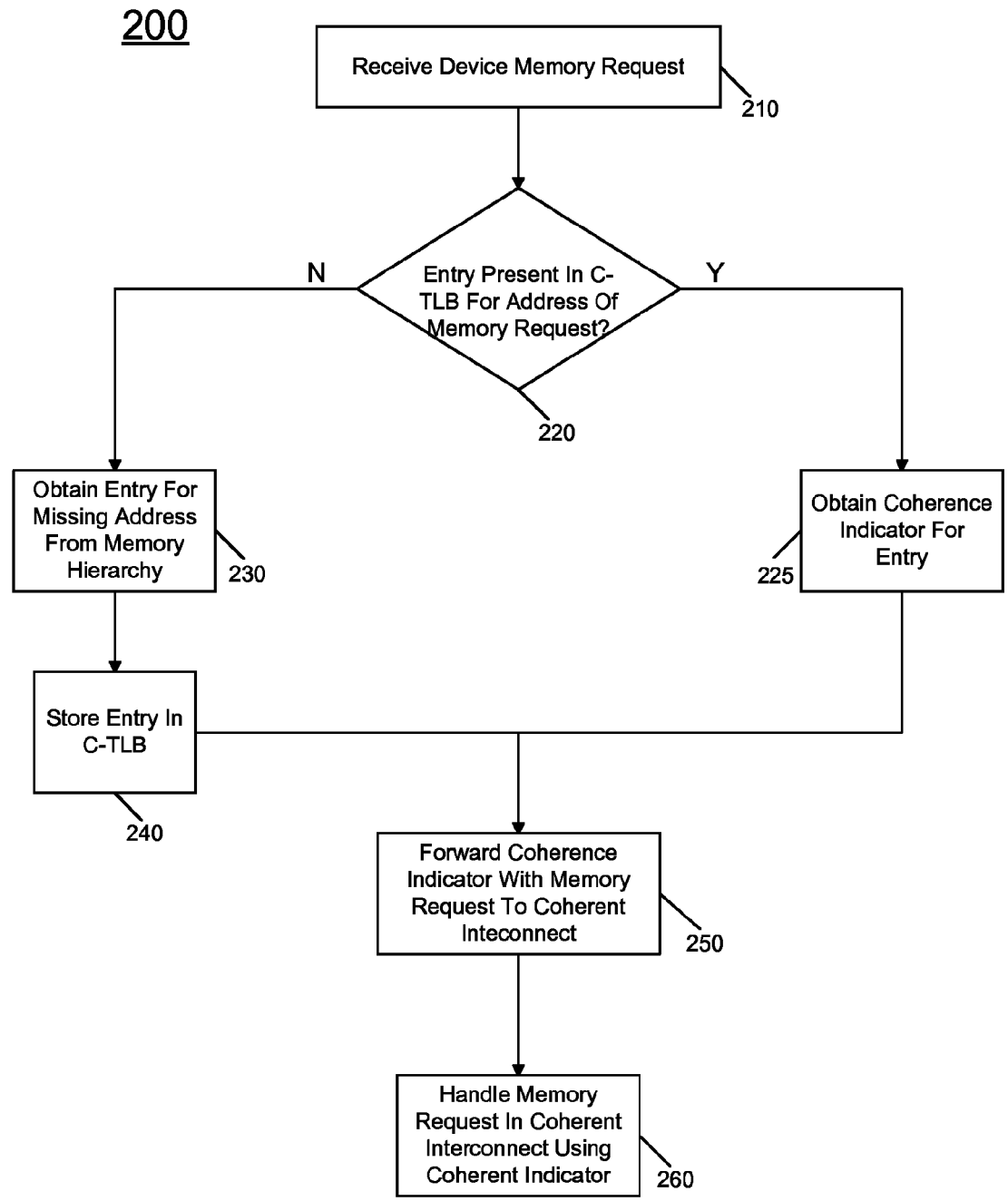
FIG. 2 is a flow diagram of a method of handling a memory request in accordance with one embodiment of the present invention.

Referring now to FIG. 2, shown is a flow diagram of a method of handling a memory request received in an interconnect from a device coupled thereto. As shown in FIG. 2, method 200 may begin by receiving a device memory request (block 210). Note that this memory request, which may be a read or write request for a given physical address, may be received without any indication of whether the request is to be handled in a coherent or non-coherent manner. That is, this request may be a generic memory request without any coherency information, thus reducing the burden on the device programmer. Thus coherency information is added to a memory request dynamically at execution time, e.g., via information present in hardware such as the c-TLB.

Next, it may be determined whether an entry for an address of the memory request is present in a c-TLB (diamond 220). If so, the coherency indicator of the entry may be obtained (block 225), and the coherency indicator may be forwarded along with the memory request to another interconnect, e.g., a coherent interconnect (block 250). In this way, the need for a programmer to code a coherency hint is avoided.

If instead the entry is not present in the c-TLB, miss processing may be performed and the entry for the missing address may be obtained from a memory hierarchy (block 230). More specifically, the miss processing may cause a request to be sent to one or more processor cores to determine whether the missing entry is present in a mapping structure, e.g., a TLB of one of these cores. If so, the entry may be sent to the IO interconnect, where it can be loaded into the c-TLB. Otherwise, additional miss processing may be performed, e.g., a miss handler may be run in the core that is the owner of the corresponding address location, so that the missing entry can be obtained from memory and stored into the TLB. Then, in one implementation a response indicating that the TLB entry has been filled may be sent back to the IO interconnect, which may cause the miss request to again be sent to the TLB, this time resulting in a transfer of the entry to the c-TLB. If not present in memory, a page fault may occur. As such if there is no hit in the processor TLB or page tables, an OS mechanism may be used to load the page table into the processor TLB. After finishing page fault handling, the processor informs the device of its completion. At that point, the c-TLB miss handler retries the request and obtains information from the TLB. Accordingly, control may then pass to block 250. There, the memory request and corresponding coherency indicator may be sent to the coherent interconnect, as discussed above.

As further shown in FIG. 2, the coherent interconnect may process the memory request using the coherency indicator (block 260). For example, if the coherency indicator indicates that the memory location is non-coherent, the memory request, which assume for purposes of discussion is a write transaction, may be sent directly from the coherent interconnect to a memory controller and off to memory to handle the write transaction. As another example, assume a read transaction with a coherency indicator indicating a coherent transaction. In this case, the coherent interconnect may stall the coherent request, send snoop requests to various cores and caching agents to determine whether the data is present in one of those locations and if so, the state thereof. Based on snoop responses, the coherent interconnect may handle the memory request accordingly. For example, the coherent interconnect may forward the read request along to a cache indicated to include a shared or modified copy of the data, for example. While shown with this particular implementation in the embodiment of FIG. 2, the scope of the present invention is not limited in this regard.

Note that a c-TLB lookup can be performed in parallel with other operations so it will not incur a delay if it is a hit. A c-TLB miss can be handled using whatever method the processor uses to handle a processor TLB miss such as a hardware pagetable walker (e.g., in the case of x86). In some embodiments the c-TLB may have a small number of entries, e.g., as few as four entries. Because IO traffic is usually sequential, e.g., while copying a file, when one TLB entry is refilled, one or more additional entries can be pre-filled, e.g., each at a page offset. Thus as IO devices usually access data sequentially, a basic, sequential prefetching into the c-TLB can be highly effective. In one example, in an embodiment having a c-TLB with 64 entries, the miss rates may be at negligible levels for the vast majority of applications. As several prefetch examples, two entries may be pre-filled (as opposed to flushing the whole c-TLB), or where 16 entries are present, four entries can be filled at a time, or so forth.

When there is a page fault, the handler in the OS can invalidate the affected c-TLB entry. Such invalidation may be handled as with other TLB consistency issues in multiprocessors, e.g., via use of TLB shootdowns or other operations to clear the faulting entry. In addition to forwarding this operation to other processors, embodiments may further send the same flush type operation to the c-TLB. If however, a TLB flush instruction propagated to the IO interconnect is not an option, a memory-mapped IO (MMIO) write operation can be performed to realize the same result. Note that the performance of page fault handling does not matter since it is a rare case.

For backward compatibility purposes, software can disable address range-based coherence control, either on a per-application basis or system-wide. This will also allow extremely performance-sensitive and power-sensitive device drivers to use non-coherent IO requests on memory ranges that are cacheable in the processor page table, once the c-TLB is disabled. In some embodiments, the c-TLB or other coherency mechanisms of the IO interconnect can be disabled by a device driver. As the device driver is aware of this disabling, the driver may then send requests with the coherency hint. In other solutions, a default may be set to handle requests according to a coherency mode if no coherency indication is received from the IO interconnect.

Table 1 is a listing of possible combinations of coherency states with regard to processor and IO device. As seen, embodiments can prevent inconsistent views of coherency with regard to a given address range.

TABLE 1

|  | IO memory request = coherent | IO memory request = non = coherent |
| --- | --- | --- |
| Processor-side page attribute = coherent | Expected case | Avoided using embodiments of the present invention the proposed mechanism is used |
| Processor-side page attribute = non-coherent | Avoided using embodiments of the present invention | Expected case |

In this way, a reduction in programming complexity for a SoC application software developer can be realized. With a consistent mechanism handling coherence choices, potentially problematic combinations can be eliminated as shown in Table 1. Thus applications that use attached IP blocks will be easier to develop and debug.

While described herein for a SoC implementation, embodiments may be equally applicable to PCIe and most other IO device interconnects. Note that while in x86 machines, cacheability and cache coherence are not differentiated, for systems that use different bits to represent cacheability and coherence/non-coherence a c-TLB can be designed accordingly, e.g., with separate field for coherence/non-coherence. In general, accesses that do not perform snoops are non-coherent accesses, and vice versa. However, in some implementations a user may want to cache data, but not want to perform snoops. In this way, the benefit of caching is realized, without paying the overhead of a snoop request. However, what is cached may actually turn out to be invalid data, but at least there is no penalty. To handle such cases, different indicators for each of cacheability and coherency thus may be present.

While certain embodiments may be implemented in a system-on-chip (SoC) configuration, which may be the primary processing capabilities for a computing device such as an embedded, portable or mobile device, other implementations may be used in other systems such as multiprocessor computer systems having a processor coupled to a coherent interconnect, that in turn may be coupled to an IO interconnect via one or more chipsets or other components. Still further, embodiments may be implemented in a multi-chip architecture for a computing device.

Figure 3:
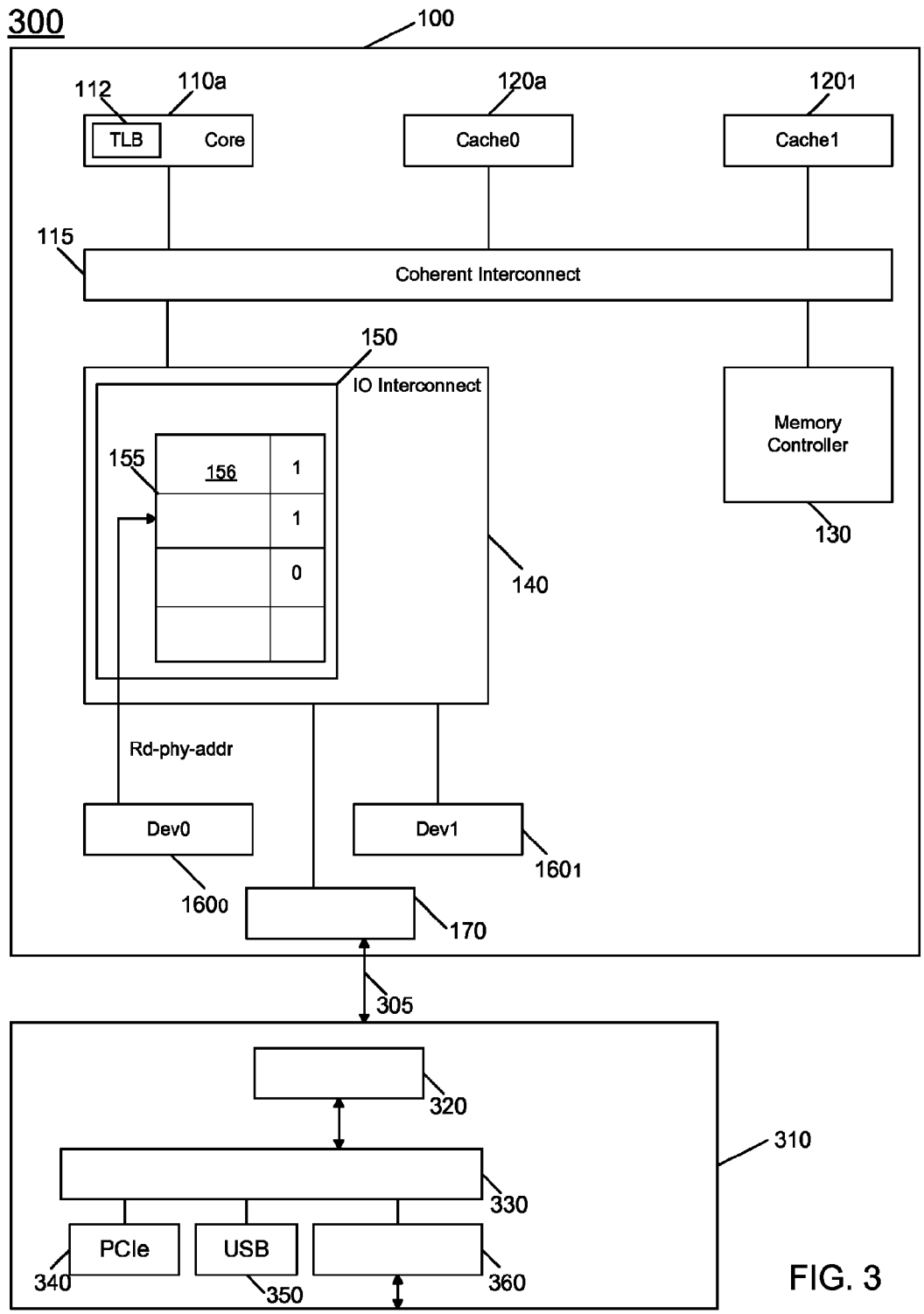
FIG. 3 is a block diagram of a system in accordance with another embodiment of the present invention.

Referring now to FIG. 3, shown is a block diagram of a system in accordance with another embodiment of the present invention. As shown in FIG. 3, system 300 may be multi-chip architecture, namely a system 300 including a first chip 100, which may be a first SoC, and which may be configured the same as that of FIG. 1, and a second integrated circuit 310, which may provide peripheral functionality. As shown in FIG. 3, SoC 100 may communicate with IC 310 via an interconnect 305 that in turn is coupled to a first bridge 170 of SoC 100 and a second bridge 320 of IC 310. In turn, second bridge 320 may be coupled to an IO interconnect 330 that in turn can be coupled to one or more peripheral devices, e.g., a PCIe device 340 and a universal serial bus (USB) device 350. Still further, IO interconnect 330 may be coupled via a third bridge 360 to off chip components via a serial over network interface (SONIC)/external fabric. In the embodiment shown in FIG. 3, note that both IO interconnect 140 and IO interconnect 330 may include c-TLBs or other coherent mapping mechanisms in accordance with an embodiment of the present invention. While shown with this particular implementation in the embodiment of FIG. 3, other implementations are of course possible.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
receiving a memory request from a peripheral device corresponding to an intellectual property (IP) block of a system on a chip (SoC) coupled to a downstream side of an input/output (IO) interconnect of the SoC coupled between the IP block and a coherent interconnect of the SoC;

accessing a first buffer of the IO interconnect to determine if an entry corresponding to an address of the memory request is present therein, the first buffer including a plurality of entries each to store a coherency indicator to indicate whether data associated with the memory request is to be handled in a coherent or non-coherent manner; and if so, obtaining a coherency indicator from the entry and sending the memory request and the coherency indicator to the coherent interconnect coupled to an upstream side of the IO interconnect, wherein the memory request received from the IP block does not include an indication of whether the memory request is to be handled in the coherent or non-coherent manner.

2. The method of claim 1, further comprising if the entry is not present, generating a miss request to request the entry from a second buffer of a core coupled to the coherent interconnect, and sending the miss request to the coherent interconnect.

3. The method of claim 2, further comprising receiving at least a portion of the entry from the second buffer and storing the coherency indicator in the first buffer.

4. The method of claim 3, further comprising prefetching at least a portion of at least one additional entry from the second buffer and storing at least one additional coherency indicator in the first buffer, the at least one additional entry corresponding to an address sequential to the address of the memory request.

5. The method of claim 1, wherein the memory request received from the IP block does not include any coherency information.

6. The method of claim 1, further comprising disabling the first buffer during execution of a second application after execution of a first application during which the memory request is received and the first buffer is enabled, and receiving a second memory request in the IO interconnect from the IP block during the second application with a coherency hint to indicate whether the second memory request is to be maintained coherent.

7. The method of claim 1, further comprising receiving the memory request and the coherency indicator in the coherent interconnect and using the coherency indicator to handle the memory request.

8. The method of claim 7, further comprising sending a snoop request for the address of the memory request to at least one cache if the coherency indicator is indicative of a coherent status and stalling the memory request in the coherent interconnect until receipt of a snoop response to the snoop request.

9. The method of claim 7, further comprising sending the memory request directly to a memory coupled to the coherent interconnect if the coherency indicator is indicative of a non-coherent status.

10. An apparatus comprising:
a core to execute instructions, the core including a translation lookaside buffer (TLB), the TLB including a plurality of entries each having a translation field to map a virtual address to a physical address and a coherency field to store a coherency indicator that indicates whether a memory page corresponding to the entry is to be handled in a coherent or non-coherent manner;
a coherent interconnect coupled to the core;
an input/output (IO) interconnect coupled to the coherent interconnect, the IO interconnect including a coherency-TLB (c-TLB) including a plurality of entries each having an address field and a coherence field to store a coherency indicator from a corresponding entry of the TLB, the coherency indictor to indicate whether a memory page corresponding to the corresponding entry is to be handled in a coherent or non-coherent manner; and
at least one peripheral device coupled to the IO interconnect to provide a memory request to the IO interconnect, the IO interconnect to access the c-TLB to obtain a coherency indicator if an entry corresponding to the memory request is present therein, the memory request and the coherency indicator to be forwarded from the IO interconnect into the coherent interconnect.

11. The apparatus of claim 10, wherein the at least one peripheral device is to generate the memory request without an indication of coherency.

12. The apparatus of claim 10, wherein the apparatus comprises a system on a chip (SoC) formed on a single semiconductor die, and the at least one peripheral device comprises an intellectual property (IP) block.

13. The apparatus of claim 10, wherein if the entry corresponding to the memory request is not present in the c-TLB the IO interconnect is to generate a miss request to request the entry from the TLB, and send the miss request to the coherent interconnect.

14. The apparatus of claim 13, wherein the IO interconnect is to receive at least a portion of the entry from the TLB and store the coherency indicator of the entry in a corresponding entry of the c-TLB.

15. The apparatus of claim 14, wherein each entry of the TLB further includes a cacheability field to store a cacheability indicator that indicates whether the memory page can be cached.

16. The apparatus of claim 15, wherein the IO interconnect is to receive the entry portion from the TLB and store the cacheability indicator in a corresponding entry of the c-TLB.

17. The apparatus of claim 11, further comprising a second TLB in the IO interconnect, the second TLB including a plurality of entries each having a translation field to map a virtual address to a physical address.

18. A system comprising:
a first integrated circuit including:
at least one core to execute instructions and including a memory management unit (MMU) to map a virtual address for a memory location to a physical address and to associate a coherency indicator with the memory location that indicates whether a memory request for the memory location is to be handled in a coherent or non-coherent manner on an address range basis;
a first coherent interconnect coupled to the at least one core;
a first input/output (IO) interconnect coupled to the first coherent interconnect, the first IO interconnect including a storage to store the coherency indicator associated with the memory location; and
at least one peripheral device coupled to the first IO interconnect to provide a memory request for the memory location to the first IO interconnect, the first IO interconnect to access the storage to obtain the coherency indicator and forward the memory request and the coherency indicator to the first coherent interconnect, wherein the at least one peripheral device is to provide the memory request to the first IO interconnect without coherency information; and
a second integrated circuit coupled to the first integrated circuit via an inter-chip interconnect, wherein the second integrated circuit includes at least one peripheral device coupled to a second IO interconnect.

19. The system of claim 18, wherein the first IO interconnect is to generate a miss request to request the coherency indicator from the MMU if not present in the storage, and send the miss request to the first coherent interconnect.

20. The system of claim 18, wherein the storage is to store at least one memory type range register to indicate the coherency state of the address range including the memory location.

* * * * *